Figure 1:
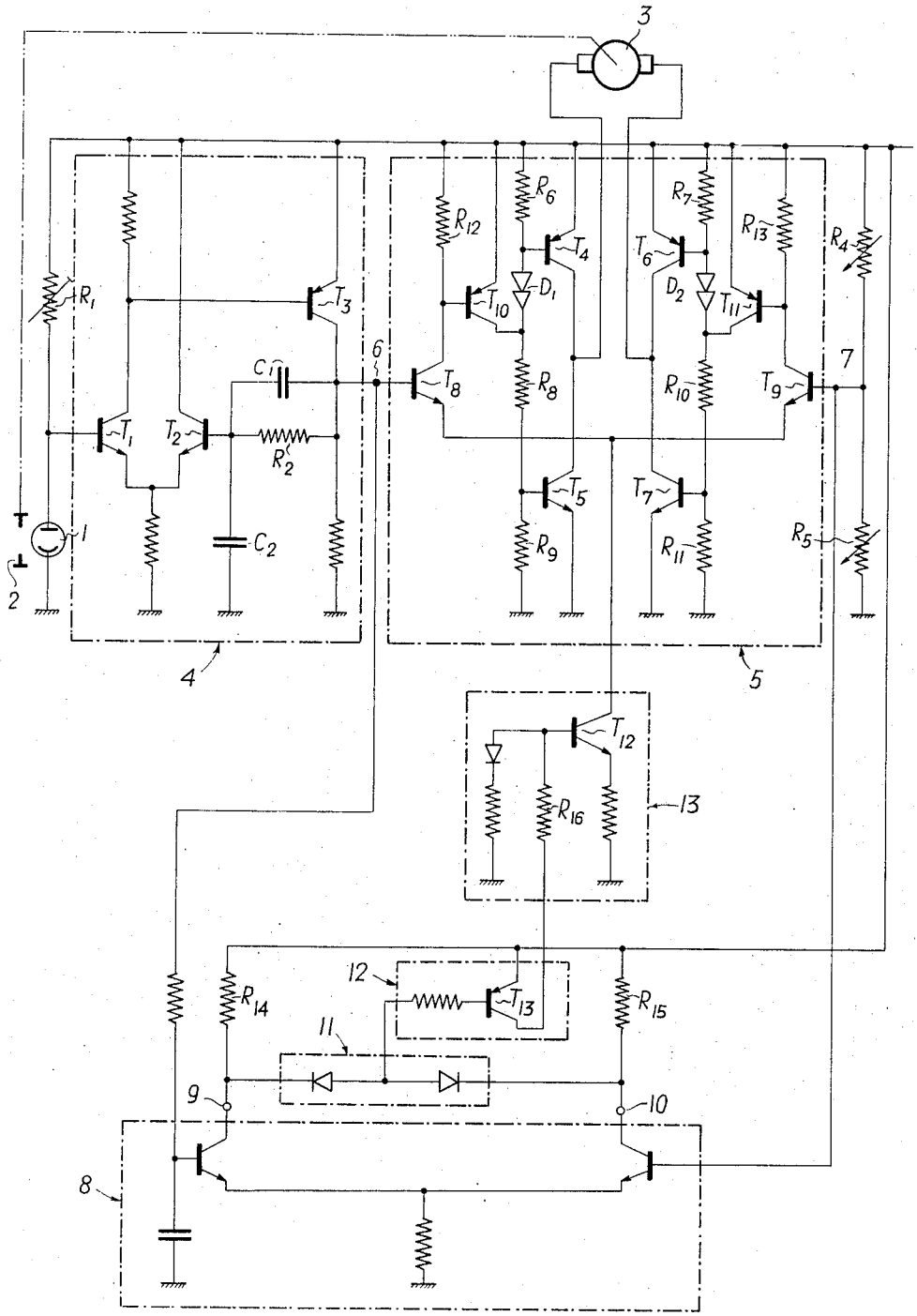

United States Patent [19]
Cap et al.

[11] 3,806,789
[45] Apr. 23, 1974

[54] CIRCUIT ARRANGEMENT FOR DIAPHRAGM CONTROL

[75] Inventors: Heinrich Cap, Vienna; Herbert Krammer, Hinterbruehl; Robert Scheiber, Vienna, all of Austria

[73] Assignees: Karl Vockenhuber; Raimund Hauser, both of Vienna, Austria

[22] Filed: Dec. 9, 1971

[21] Appl. No.: 206,466

[30] Foreign Application Priority Data
Dec. 15, 1970 Austria .............................. 11286/70
Dec. 16, 1970 Austria .............................. 11337/70
Dec. 17, 1970 Austria .............................. 11397/70

[52] U.S. Cl................. 318/640, 318/561, 318/678, 318/681
[51] Int. Cl............................ G05b 1/06, G05f 1/00
[58] Field of Search ............ 318/681, 678, 561, 640

[56] References Cited
UNITED STATES PATENTS
| | | | |
|---|---|---|---|
| 3,673,512 | 6/1972 | Walters.............................. | 318/621 |
| 3,422,326 | 1/1969 | White et al. ..................... | 318/681 X |
| 3,523,228 | 8/1970 | Currie et al..................... | 318/681 X |
| 3,471,759 | 10/1969 | Broverman ..................... | 318/681 X |
| 3,378,739 | 4/1968 | Livengood et al. ............. | 318/681 X |
| 3,525,029 | 8/1970 | Joslyn et al. ................... | 318/681 X |
| 3,605,001 | 9/1971 | Miyakawa..................... | 318/681 X |

*Primary Examiner*—B. Dobeck

[57] ABSTRACT

A circuit arrangement, comprising a direct-current source, and means having time constants including an electric motor, having an operative condition and an inoperative condition, the transition from operative to inoperative condition thereof occurring with a predetermined first time constant. A circuit means constituting a closed control loop includes the direct-current source and the motor to control the same and has feedback means. An amplifier stage within the control circuit is between said direct-current source and the motor, and has a predetermined direct-current gain, and a negative feedback loop on the amplifier stage comprises an integrating means having a predetermined second time constant.

14 Claims, 7 Drawing Figures

CIRCUIT ARRANGEMENT FOR DIAPHRAGM CONTROL

This invention relates to a circuit arrangement, preferably for diaphragm control, particular in cameras, which circuit arrangement comprises a motor, which is fed from a direct-current source, e.g., by means of a comparator circuit, and which is preceded by a differentiating stage, and which circuit arrangement also comprises, if desired, a photoelectric transducer which is connected in circuit and receives light, e.g., from a reflecting shutter. In such circuits it is a disadvantage that the motor as well as the photoelectric transducer included in automatic diaphragm control circuit have a certain integrating activity, which in practice results in a phase displacement between the desired behavior and the actual behavior of the motor. As applied to the automatic diaphragm control in cameras this means that the lag which is introduced by the photoelectric transducer and by the motor results in a delay of the response and de-energization relative to the occurrence of variations of light. The long starting and coasting times of the motor may induce oscillations in the arrangements. To avoid these problems, it is conventional to reduce the adjusting speeds to use automatic control systems having a low gain and in some cases to provide intentionally for a relatively high mechanical uncertainty of the response. The disadvantage involved in these measures are tolerated.

The invention is based on the above-mentioned recognition that the behavior of the motor and of any photoelectric transducer is influenced by the integrating activity thereof. For this reason it is proposed according to the invention that the differentiating stage has a predetermined direct-current voltage gain and the motor is preferably a rotor motor, i.e., a motor having a rotor adapted to perform consecutive revolutions, and can be short-circuited in known manner. The short-circuiting of the motor serves to minimize the time constant so that oscillations are prevented. The differentiating stage which precedes the motor at least partly eliminates the integrating activity of the motor and of any photoelectric transducer. Within the scope of the invention, the differentiating stage consists preferably of an amplifier, which may have unity gain and which is provided with a negative feedback circuit including an integrating resistance-capacitance circuit, which has a time constant that preferably agrees to that of the motor and of any photoelectric transducer which is provided. In this case, the circuit arrangement may be much simplified if the motor is controlled by a comparator circuit and the differentiating stage precedes the comparator circuit.

It is believed that a comparator circuit for controlling the motor is required for the main application of the circuit arrangement according to the invention. Where such comparator circuit is used it may be difficult to enable the short-circuiting of the motor. According to a preferred embodiment of the invention, this may be enabled in that the comparator circuit includes a transistor bridge circuit having one pair of transistors of one conductivity type and another pair of transistors of the opposite conductivity type and those of these transistors which are connected to the bridge circuit at opposite ends of a diagonal thereof can be rendered conducting and transistors which are included in different bridge arms and to which the same potential is applied can be cut off. Such circuit arrangement enables a short-circuiting of the motor without need for relays.

It will be of special advantage if the amplifier provided with a negative feedback circuit is connected as an astable multivibrator. This enables an intermittent control of the motor, particularly when the amplifier is fed with timing pulses. This is the case in motion picture camera having reflecting shutters because in such cameras the photoelectric transducer is intermittently fed with light through the shutter. The use of a low d.c. gain and a high a.c. gain enables the utilization of these timing pulses for the control of the motor itself.

It is known to detect a voltage difference by means of comparators which may consist of a Wheatstone bridge circuit or a differential amplifier. Such circuits are often used to control the diaphragm in camera or other appliances. The output of such comparator circuit is usually connected to a motor, which is controlled by the comparator circuit. If the motor consists of a rotor motor, the same can be controlled by means of a switching circuit. Such arrangements have the disadvantage that there is a closed-circuit current even when the comparator circuit is in a balanced stage and this closed-circuit current is virtually lost. This closed-circuit current is particularly high with intermittently controlled circuits and in this case the closed-circuit current may be even higher than the current flowing during the operation of the motor. This fact is particularly undesirable in portable appliances, such as cameras, because it reduces the life of the batteries. Whereas a comparator circuit is known which is intended to control the diaphragm of a motion picture camera and in which no current flows through the motor when the comparator circuit is balanced (see KINOTECHNIK No. 4/1963, pages 113 et seq.), in that circuit arrangement the comparator circuit is separated from the motor circuit and a relay for controlling the motor is included in the diagonal of the comparator circuit consisting of a Weatstone bridge circuit. This circuit arrangement has several disadvantages. In the first, place, the circuit including the comparator circuit remains closed even when the bridge is balanced so that the discharge of the associated battery is continued. In the second place, a relay has a relatively high current consumption. For this reason, the known arrangement is not capable of removing the disadvantage which has been described.

This is accomplished by another feature of the circuit arrangement according to the invention in which an OR gate is provided, which has two inputs connected to the respective outputs of the differential amplifier and an output connected to the switching circuit and thus receives the two complementary signals from the two outputs and in response thereto controls the switching circuit. This OR gate may consist of the emitter diodes of the input transistors. This arrangement eliminates the need for relays and constitutes a circuit which is free of contacts and which may be used for different purposes, e.g., for controlling the comparator circuit which has been mentioned above and particularly to connect and disconnect various circuits. These circuits need not consist of a comparator circuit, because the differential amplifier itself constitutes a comparator circuit.

It will be desirable if the switching circuit consists of a constant-current source, Such constant-current sources are usually provided with a single transistor and a constant current is taken from the collector of said transistor. Such arrangement cannot be used however, where very high requirements as to accuracy are to be met because the collector current vs. collector-emitter voltage characteristics of a transistor in a common-emitter circuit are not horizontal. A circuit has been disclosed which comprises two parallel current paths which carry partial current of the current which is to be controlled and these current paths include controllable resistors which in response to variations of the supply voltage - such variations may be due to changes of the e.m.f. and/or changes of the internal resistance - and/or in response to changes of the resistance of the load are changed in mutually opposite senses and by amounts which can be adjusted by variable resistors so that the sum of the partial currents within a restricted range with slightly increase or decrease with the supply voltage or will assume a fixed value which is independent of the supply voltage, dependng on the setting of the variable resistor. The known circuit arrangement described last is relatively expensive and functions only within a relatively small voltage range.

To avoid the disadvantages of known arrangements, a current-stabilizing circuit arrangement which comprises an input transistor, which is provided with an emitter resistor and to the base of which is reference voltage, which may be variable, is applied whereas the collector of the input transistor is connected to the emitter of an output transistor, is improved according to the invention in that a fixed potential is applied to the base of the output transistor. The improved arrangement makes use of the fact that the output characteristics of transistors in a common-base circuit are substantially linear. Such constant-current sources may be used to advantage also as an emitter resistor in the above-mentioned differential amplifier.

Figure 2:
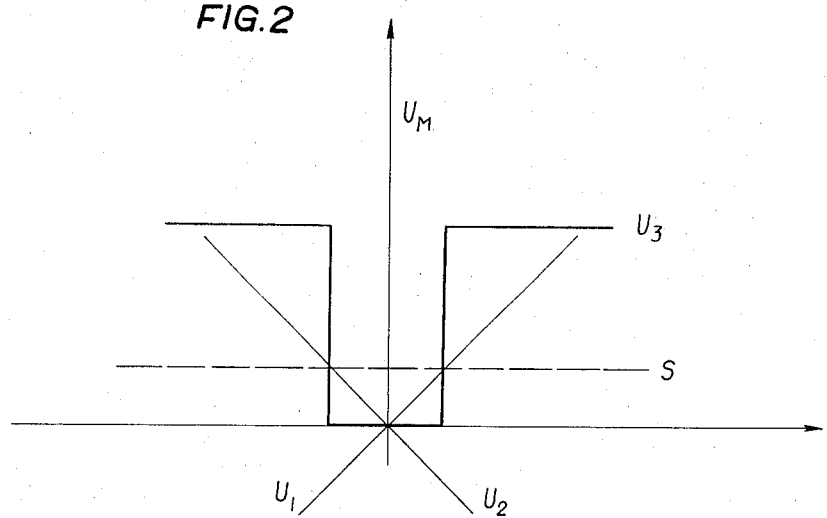
Figure 3:
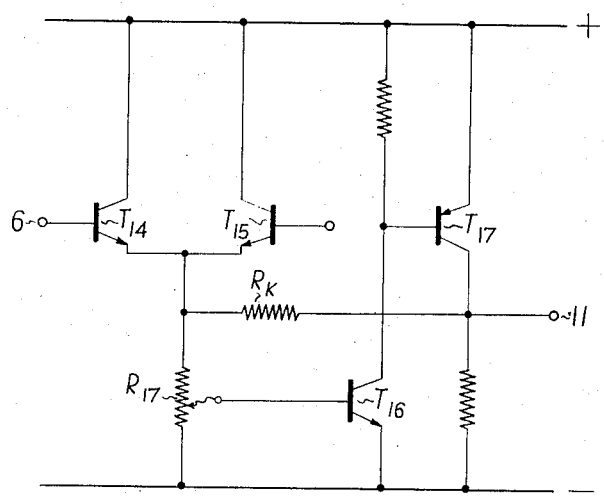
Figure 4:
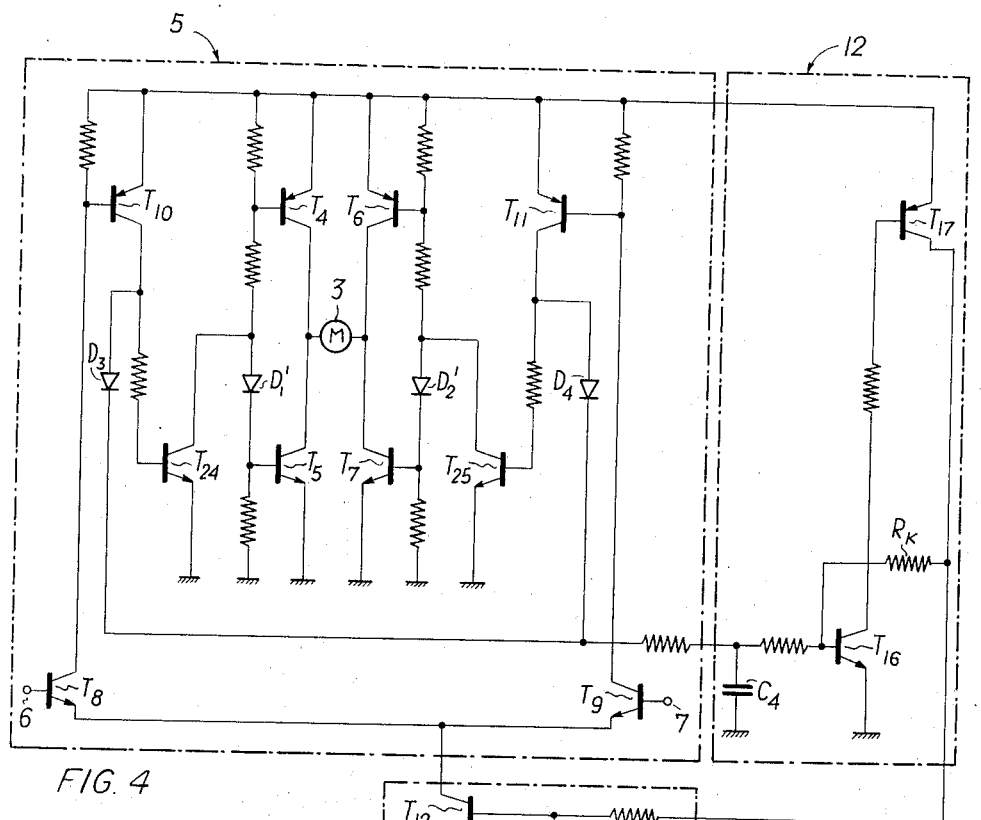
Figure 1A:
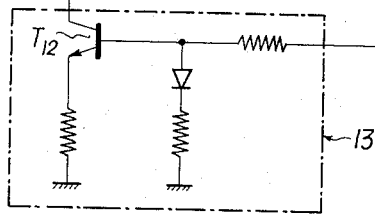
Figure 1A:
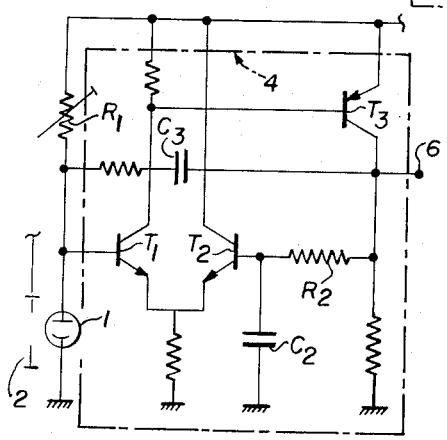
Figure 1B:
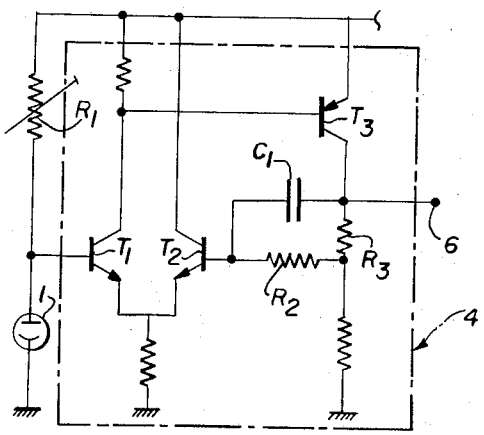
Figure 5:
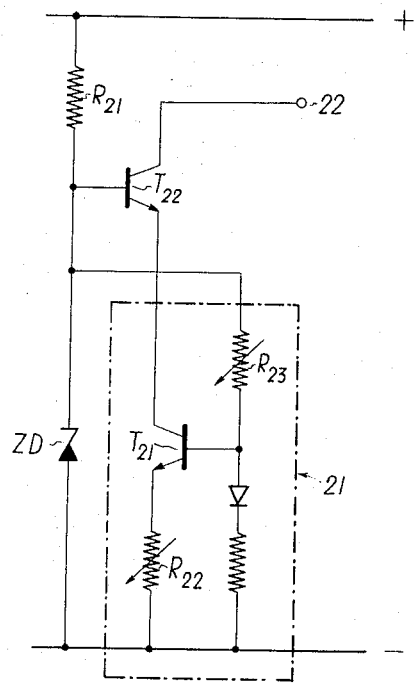

Further features and advantages of the invention will become apparent from the following description of embodiments shown diagrammatically and by way of example on the drawings, in which FIG. 1 shows a complete circuit diagram illustrating the use of a circuit arrangement according to the invention, FIGS. 1a and 1b show circuit diagrams of modifications of the differentiating stage of FIG. 1, FIG. 2 illustrates the switching function of a circuit arrangement according to the invention, FIG. 3 shows a different embodiment, FIG. 4 shows a modification of a detail and FIG. 5 illustrates a constant-current source according to the invention.

An automatic diaphragm control system of a camera includes in circuit with a d.c. source, not shown, a photoelectric transducer consisting of a photoconductor 1, which receives light through a diaphragm 2, which precedes the photoconductor and is controlled by a motor 3. The latter is controlled by the photoconductor 1.

The photoconductor 1 is included in one branch of a voltage divider. The other arm of the voltage divider includes an adjustable resistor $R_1$. The intermediate tap of the voltage divider is connected to a differentiating stage 4, and the latter is connected to a comparature circuit 5, which feeds current to the motor 3 to cause the same to run in one direction or the other and thus to open or close the diaphragm 2. It is apparent that the comparator 5 has two inputs 6, 7, which are connected to a differential amplifier 8. The two outputs of the differential amplifier are connected by terminals 9, 10 to an OR gate 11.

The differential amplifier 8 and the OR gate 11 detect whether the comparator 5 is balanced. When this is the case, the motor 3 is deenergized by a control stage 12 and a switching circuit consiting of a constant-current source 13. This is particularly important because the closed-circuit current flowing through the motor 3 is particularly high in intermittently controlled circuits. As will be described hereinafter, this circuit enables an intermittently controlled energization of the motor. The differentiating stage 4 which precedes the motor 3 signals to the motor that it approaches its desired position so that the motor is progressively decelerated as it approaches its desired position. In this way, an overshoot beyond the desired position and a hunting of the arrangement about the desired position will be avoided, and a high adjusting speed is enabled in conjunction with a highly accurate adjustment. It is not essential to arrange the differentiating stage 4 before the comparator circuit 5 although this arrangemnt will result in simpler circuitry.

The differentiating stage 4 substantially consists of an amplifier, which comprises an input transistor $T_1$ and an emitter follower transistor $T_2$. The base of an output transistor $T_3$ is connected to the collector of the input transistor $T_1$. The output of the output transistor $T_3$ is connected to a resistance-capacitance circuit consisting of a resistor $R_2$ and a capacitor $C_2$ and having a time constant which suitably agrees to the starting or coating time of the motor 3.

The differentiating stage 4 has a frequency response, the gain increasing with frequency. With the circuit shown, the differentiating stage 4 may be used to produce sampling pulses. In this case, the capacitor $C_1$ is replaced by a capacitor $C_3$ (FIG. 1a). A resistor $R_3$ may be provided and the capacitor $C_2$ may be omitted (FIG. 1b). The capacitor $C_1$ prevents an excessive increase of the gain with high frequencies. The a.c. voltage which is generated by the photoconductor 1 in response to the light from the reflecting shutter, which is usually provided in motion picture cameras, should be only slightly amplified. This is ensured by the capacitor $C_1$ and the resistor $R_2$. On the other hand, this a.c. voltage should give rise to a response of the motor-controlling bridge circuit because the intermittent control of the motor results in a proportional range and an exact adjustment.

The comparator circuit 5 consists substantially of a transistor bridge circuit including transistors $T_4$ to $T_7$ at the joints of the bridge. This bridge circuit ensures that a voltage having the corrent polarity is applied to the motor 3 in accordance with the signal which is compared by the resistors of the bridge. The resistors of the bridge are constituted on one side by the photoconductor 1 and the resistor $R_1$ and on the other side by resistors $R_4$, $R_5$.

The shorter the coasting time of the motor 3, the more advantageous and simpler is the arrangement which can be selected for the differentiating stage 4. For this reason it is desired to short-circuit and thus to brake the motor 3 when the controlling bridge circuit is balanced. Some problems arise, however, in connection with the short-circuiting of a motor within a comparator circuit. Above all, the balance of the bridge circuit must not be disturbed. Besides, relays should be avoided, if possible, because they give rise to difficulties. In the circuit which is shown, the problem has been solved in that the transistors connected at the ends of each diagonal ($T_4$, $T_7$ or $T_5$, $T_6$) can be rendered conducting or the transistors $T_4$, $T_6$ which are included in different branches of the bridge circuit and to which the same potential is applied. This will be the case when the same voltage is applied to the input terminals 6, 7 of the comparator circuit and is transmitted by the input transistors $T_8$, $T_9$. In this case the base current of the control transistors $T_{10}$, $T_{11}$ connected to the collectors of the input transistors $T_8$, $T_9$ is decreased so that the transistors $T_4$, $T_6$ are cut off. The base of each of the two bridge transistors $T_4$, $T_6$ is connected to a voltage divider, which comprises in one arm a resistor $R_6$ or $R_7$ having a relatively high resistance and in the other arm a series diode circuit $D_1$ or $D_2$; that other arm is connected to the junction to which the respective control transistor $T_{10}$ or $T_{11}$ is connected. Because the control transistors $T_{10}$, $T_{11}$ are cut off, base current flows through the series diode circuits $D_1$ or $D_2$ and through resistors $R_8$, $R_9$ or $R_{10}$, $R_{11}$ connected to the bases of the bridge transistors $T_5$, $T_7$. As a result, the bridge transistors $T_4$, $T_6$ are conducting whereas the other two bridge transistors $T_5$, $T_7$ remain cut off.

When the bridge circuit is unbalanced, the input transistor $T_8$, for instance, will draw more current and the threshold voltage at a base resistor $R_{12}$ for the control transistor $T_{10}$ will be exceeded so that the latter is rendered conducting. As a result, the potential between the resistor $R_8$ and the series diode circuit $D_1$ is increased so that the bridge transistor $T_4$ is cut off first. As the current through the control transistor $T_{10}$ increases, the current flowing through the base resistors $R_8$, $R_9$ associated with the bridge transistor $T_5$ will increase so that its threshold voltage is exceeded and the transistor $T_5$ is rendered conducting. The motor 3 is then energized via the bridge transistors $T_5$ and $T_6$. As soon as the bridge circuit is balanced, the bridge transistor $T_5$ is cut off and the bridge transistor $T_4$ is rendered conducting.

This arrangement may be used as an exactly operating automatic diaphragm control circuit, which strongly suppresses oscillation. The advantage which is due to the differentiating stage 4 will be obtained if the motor 3 consists of a rotor motor or of a galvanometer. In the former case, however, the advantages afforded by the differentiating stage 4 are even more significant, particularly if the motor is intermittently controlled. In this case, however, a problem arises which resides in that a pulse-spaced ratio of, e.g., 1:1 is obtained so that the motor is stopped then draws a high current, which is even higher than when the motor is running. For this reason it is highly desirable to deenergize the motor 3 when the bridge is balanced.

For this purpose, a differentiating amplifier 8 is connected to the input terminals 6, 7 of the comparator circuit 5. The differential amplifier 8 is of usual design and for this reason need not be described in detail. Different from the usual arrangement, an OR gate 11 is connected to output terminals 9, 10 of the differential amplifier 8 and receives the output signal of the differential amplifier and the complement of said output signal and transforms these signals into signals having the same sign, The output of the OR gate 11 is connected to a control stage 12, which includes a transistor $T_{13}$. The output of the transistor is coupled by a resistor $R_{16}$ to a switching circuit, which consists of a constant-current source 13 comprising a transistor $T_{12}$. When an unbalance of the bridge results in an output signal at one of the terminals 9 and 10, the control stage 12 renders the transistor $T_{12}$ conducting to ground the input transistors $T_8$, $T_9$ of the comparator circuit 5. As a result, the transistor bridge $T_4$ to $T_7$ is deenergized.

In the embodiment shown by way of example, the two input transistors $T_8$, $T_9$ of the comparator circuit 5 constitute a differential amplifier. The additional differential amplifier 8 could be saved and the OR gate 11 could be connected to the existing differential amplifier. In this case, the output of the control transistors $T_{10}$, $T_{11}$ could be connected to the diodes of the OR gate and the output of the OR gate could be used to cut off the current in the transistor bridge by means of suitable control and switching stages. The switching functions of the circuit arrangement according to the invention is apparent from FIG. 2. It may be assumed that a voltage $U_1$ is applied to one input of the OR gate and a voltage $U_2$ of the same magnitude but opposite polarity to the other input. The threshold value of the two diodes of the OR gate is indicated by the dotted line S. The resulting output voltage $U_3$ is indicated by a thick solid line and is shown to have an axis of symmetry. For certain applications it may be desirable to provide an output voltage $U_3$ having exactly the opposite course, i.e., one which is cut off when the input voltages $U_1$, $U_2$ rise above the threshold value and vice versa. Such switching function can also be provided for, of course. The axis of symmetry $U_M$ which is shown may be shifted in that the base of one of the input transistors of the differential amplifier 8 is connected to a voltage divider, which may be adjustable. An adjustable emitter resistor may be used for the two transistors forming the differential amplifier 8 so that the width of the step resulting in the output voltage $U_3$ can be adjusted. In this case, the arrangement according to the invention affords the special advantage that it permits of a more exact and much narrower switch differential. Finally, the switching step of the output voltage $U_3$ need not be symmetrical to the axis of symmetry $U_M$ because the resistors $R_{14}$, $R_{15}$ may be adjustable so that a displacement relative to the axis of symmetry $U_M$ may be adjusted. For higher requirements, the emitter resistor connected to the transistors of the differential amplifier 8 may consist of a constant-current source.

Within the scope of the invention, an embodiment which is simplified compared to the embodiment of FIG. 1 may be provided. In that simplified embodiment, the diodes of the OR gate consist of the emitter diodes of the output transistors of the differential amplifier. Such embodiment is shown in FIG. 3. In this case, transistors $T_{14}$, $T_{15}$ connected to the input terminals 6, 7 constitute a differential amplifier and have emitter diodes which form the OR gate. In accordance therewith the output signal is derived from the emitters of these two transistors $T_{14}$, $T_{15}$ and is applied by a base voltage divider $R_{17}$ to an input transistor $T_{16}$ of a Schmitt trigger. The collector of the input transistor $T_{16}$ of the Schmitt trigger is connected to an output transistor $T_{17}$, and the collector of the latter is connected to an output terminal 11. The output transistor $T_{17}$ is suitably coupled to the base of the input transistor $T_{16}$ by a feedback resistor $R_K$, which has a relatively high resistance.

Whereas the circuitry shown in FIG. 3 is simpler than that of FIG. 1, it may be a disadvantage that an amplification is not possible because the output signal is taken from the emitters of the transistors $T_{14}$, $T_{15}$. For those cases in which an amplification is desired, the connection of the OR gate to the collector outputs of the differential amplifier is preferred. In such embodiment, the switching circuit connected to the output of the circuit arrangement may also consist of a Schmitt trigger. The transistor $T_{12}$ of the constant-current source may constitute also the output transistor of the Schmitt trigger. The positive feedback by means of the resistor $R_K$ shown in FIG. 3 enables a particularly low hysteresis. This resistor may be adjustable.

In the modification shown in FIG. 4, the circuit arrangements 5, 8, 11, 12, 13 are combined and simplified. The input terminals 6 and 7 are connected to the bases of input transistors $T_8$, $T_9$, and the collectors of these transistors are connected to control transistors $T_{10}$, $T_{11}$. There is no additional differential amplifier. An OR gate consisting of diodes $D_3$, $D_4$ is directly connected to the existing differential amplifier $T_8$ to $T_{11}$ for controlling the motor. Bridge-controlling transistors $T_{24}$ and $T_{25}$ are required to control the transistor bridges $T_4$ to $T_7$. These bridge-controlling transistors $T_{24}$, $T_{25}$ are operable to shift the potential of respective bridge halves in a negative direction so that one ($T_5$ or $T_7$) of the npn transistor $T_5$ and $T_7$ of the bridge and thereafter the diagonally opposite pnp transistor $T_6$ or $T_4$ of the bridge are rendered conducting. The motor 3 is short-circuited by the bridge transistors $T_5$, $T_7$ when the bridge is balanced.

Another difference of this embodiment resides in that a control stage 12 consisting of a Schmitt trigger is connected to the output of the OR gate $D_3$, $D_4$ and is succeeded by the constant-current source 13. The Schmitt trigger consists of the input transistor $T_{16}$ and the output transistor $T_{17}$, the output or collector of which is connected by the feedback resistor $R_K$ to the base of the input transistor $T_{16}$. A feedback could be provided between the collector of the transistor $T_{12}$ and the base of the transistor $T_{17}$. In the case, the transistors $T_{12}$ and $T_{17}$ constitute the Schmitt trigger, which is controlled by the transistor $T_{16}$. However, the illustrated arrangement is preferable.

Various modifications are possible within the scope of the invention. For instance, the control transistors $T_{10}$, $T_{11}$ and/or the bridge-controlling transistors $T_{24}$, $T_{25}$ may be provided with emitter followers. In the embodiment of FIG. 1, the control stage 12 may also consist of a Schmitt trigger, the output transistor of which may consist of the transistor $T_{12}$ of the constant-current source. The capacitor $C_4$ shown in FIG. 4 serves only to slightly increase the threshold value so that continual responses to small changes of the light value are prevented. This is desirable in view of the high tolerances of the film. The capacitor $C_4$ may be omitted, if desired.

According to FIG. 5, a constant-current source 21 of conventional design comprises an input transistor $T_{21}$ in a common-emitter circuit. Such constant-current source 21 has the disadvantages which are described hereinbefore. To eliminate these disadvantages, the collector or output of the input transistor $T_{21}$ is connected to the emitter of an output transistor $T_{21}$ is connected to the emitter of an output transistor $T_{22}$, which is included in a common-base circuit. A voltage divider connected to the base of the transistor $T_{22}$ consists of a resistor $R_{21}$ and a voltage limiter consisting of a Zener diode. In the embodiment shown, that Zener diode has a dual function. It has a temperature response with such high positive temperature coefficient that the negative temperature response of the base-emitter diode of the output transistor $T_{22}$ is compensated. On the othe hand, the Zener diode applies a defined voltage to the base of the input transistor $T_{21}$ of the constant-current source 21. An output terminal 22 is connected to the collector of the output transistor $T_{22}$, which is included in a common base circuit.

It may be mentioned that the emitter and base resistors $R_{22}$ and $R_{23}$ of the input transistor $T_{21}$ of the constant-current source 21 may be adjustable. The circuit arrangement according to the invention is capable of meeting extremely high requirements as to the current stabilization. With a design such as is shown by way of example on the drawings, a high accuracy can be obtained within wide temperature ranges whereas the expenditure involved in the circuitry is very low.

What is claimed is:

1. A circuit arrangement, comprising
   a direct-current source,
   means having time constants including an electric motor having an operative condition and an inoperative condition, the transistion from one condition to the other one occurring with a predetermined first time constant,
   circuit means constituting a closed control loop including said direct-current source and said motor to control the same and having feedback means,
   an amplfifier stage within said control circuit between said direct-current source and said motor, said amplifier stage having a predetermined direct-current gain, and
   a negative feedback loop on said amplifier stage comprising integrating means having a predetermined second time constant.

2. A circuit arrangement as set forth in claim 1, which further comprises,
   a differentiating stage having a predetermined direct-current voltage gain and connected between said direct-current source and said motor and adapted to feed said motor from said direct-current source,
   a comparator circuit connected between said direct-current source and said motor.

3. A circuit arrangement as set forth in claim 1, in which
   said comparator circuit is connected between said amplifier stage and said motor.

4. A circuit arrangement as set forth in claim 1, in which
   said integrating means comprises a feedback loop comprising an integrating resistance-capacitance circuit.

5. A circuit arrangement as set forth in claim 1, in which said amplifier stage is connected as an astable multivibrator.

6. A circuit arrangement as set forth in claim 1, in which
   said amplifier stage comprises an input transistor and a variable voltage divider is connected to the base of said input transistor.

7. A circuit arrangement as set forth in claim 6, in which said voltage divider includes at least one photoelectric transducer.

8. A circuit arrangement as set forth in claim 1, wherein said second time constant corresponds to the time constants of said means including said electric motor.

9. A circuit arrangement as set forth in claim 7, wherein
said means having time constants further includes at least one photoelectric transducer.

10. In a camera
a diaphragm to be controlled,
a control system for said diaphragm, which comprises a direct-current source,
means having time-constants, including
an electric motor to move said diaphragm, said motor having an operative and an inoperative condition, the transition between said conditions occurring with a predetermined first time-constant, and
photo-electric transducer means arranged to receive light through said diaphragm, said photoelectric transducer means emitting electric signals with a predetermined second time-constant,
an amplifier stage connected said direct-current source and said motor, said amplfier stage having a predetermined direct-current source, and
a negative feedback loop on said amplifier stage comprising integrating means having a predetermined third time constant.

11. The camera, as set forth in claim 10, further comprising
rotary shutter means having a reflecting surface to reflect light coming through said diaphragm towards said photoelectric transducer means.

12. A circuit arrangement, comprising
a direct-current source providing positive potential and negative potential,
an electric motor having an operative and an inoperative condition,
a control network for said motor, said control network comprising means for short-circuiting said motor, the control network including,
a bridge circuit having two branches and four diagonal ends,
a first pair of transistors of one conductivity type,
a second pair of transistors of the other conductivity type,
each of said transistors being connected at one of said diagonal ends, mean being operable to render the transistors at opposite ends of a selected diagonal of the bridge circuit conducting,
said means for short-circuiting said motor being operable to render those transistors conducting which are included in different branches of the bridge circuit and have the same potential applied thereto.

13. A circuit arrangement as set forth in claim 12, in which
each of said branches includes a transistor of the first pair and a transistor of the second pair,
the transistors of said first pair being connected to one potential, the transistors of said second pair being connected to another potential.

14. A circuit arrangement as set forth in claim 13, in which,
each of said branches includes a transistor of the first pair and a transistor of the second pair,
a base voltage divider is associated with each of said transistors,
the base voltage dividers associated with the transistors of each branch are interconnected,
one of said transistors of each of said branches is arranged to condut when said motor is in said inoperative condition,
a control transistor is connected to the junction between the base voltage dividers associated with the transistors of each branch, and
the base voltage divider connected to the inoperative condition conducting transistor of each branch comprises an arm connected to said junction and including a diode.

* * * * *